United States Patent
Pietri et al.

(10) Patent No.: US 7,602,233 B2
(45) Date of Patent: Oct. 13, 2009

(54) VOLTAGE MULTIPLIER WITH IMPROVED EFFICIENCY

(75) Inventors: Stefano Pietri, Austin, TX (US); Marcos Augusto De Goes, Sao Paulo (BR); Roberto Angelo Bertoli, Sao Paulo (BR)

(73) Assignee: Freescale Semiconductor, Inc., Austin, TX (US)

( * ) Notice: Subject to any disclaimer, the term of this patent is extended or adjusted under 35 U.S.C. 154(b) by 36 days.

(21) Appl. No.: 12/040,277

(22) Filed: Feb. 29, 2008

(65) Prior Publication Data
US 2009/0219077 A1    Sep. 3, 2009

(51) Int. Cl.
*G05F 1/10* (2006.01)
*G05F 3/02* (2006.01)

(52) U.S. Cl. .................. 327/536; 363/59; 363/60
(58) Field of Classification Search .......... 327/536, 327/427; 363/59, 60; 307/110
See application file for complete search history.

(56) References Cited

U.S. PATENT DOCUMENTS

| | | | |
|---|---|---|---|
| 5,493,486 A | 2/1996 | Connell et al. | |
| 6,975,161 B2 | 12/2005 | Yen | |
| 2005/0024125 A1 | 2/2005 | McNitt et al. | |
| 2005/0195017 A1* | 9/2005 | Chen et al. | 327/536 |

OTHER PUBLICATIONS

P. Favrat et al., A High Efficiency CMOS Voltage Doubler, IEEE Journal of Solid-State Circuits, vol. 33, No. 3, Mar. 1988.

* cited by examiner

*Primary Examiner*—Lincoln Donovan
*Assistant Examiner*—Daniel Rojas
(74) *Attorney, Agent, or Firm*—Hamilton & Terrile, LLP; Michael Rocco Cannatti

(57) ABSTRACT

A multi-stage voltage multiplication circuit and methodology are provided which use a multi-stage charge pump boosting circuit (210) and two-stage pass gate circuit (220) having complementary power switches (M6, M9, M7, M10) to efficiently develop an output voltage ($V_{OUT}$) that is higher than the input supply voltage ($V_{DD}$). By using a two-stage complementary switch to connect boosted clock signals (P1, P2) from a charge pump (210) to the multiplier output ($V_{OUT}$), return current from the storage capacitor ($C_{OUT}$) to the pumping capacitor (C1, C2) is blocked, thereby increasing power transfer efficiency, even at high clock frequencies. In addition, a boosted auxiliary voltage is generated by an additional boosting stage (230) and applied to the PMOS wells of the pass gate circuit (220), thereby preventing latch-up and backflow.

20 Claims, 4 Drawing Sheets

VOLTAGE MULTIPLIER WITH IMPROVED EFFICIENCY

BACKGROUND OF THE INVENTION

1. Field of the Invention

The present invention is directed in general to the field of integrated circuits. In one aspect, the present invention relates to a voltage multiplier charge pump circuit.

2. Description of the Related Art

To provide a desired voltage output to a particular load, charge pumps are used to deliver a higher voltage than that provided by the power supply. Typically, a charge pump circuit receives two fixed input voltages, one of the input voltages being the power supply voltage (e.g., for example from a normal 1.5V battery) and the other being a clock voltage. A booster circuit receives the input voltages and produce a higher voltage on a capacitor, while a pass gate connects the charge on capacitor of the booster circuit to an output load which includes a load capacitance to smooth the resulting voltage. When configured as a voltage multiplier, the charge pump provides a nominal output voltage that is a multiple of the input voltages, typically by providing two or more charge pump stages to provide an output voltage, where the output voltage of each voltage multiplication stage will vary as a function of the input power supply voltage and load current. Such variations in the voltage multiplier circuit output voltage can be problematic, particularly when the voltage multiplier circuit is used to drive circuits sensitive to supply voltage variations. Another drawback with conventional voltage multiplier circuits is that the threshold voltage of the pass gate transistor can reduce the amount of charge transferred to the charge pump output, particularly when the pass gate transistor is not fully turned on. Attempts to address this problem can lead to other problems, such as current return during non-aligned clock transitions and/or latch up that occurs if the well bias of p-channel MOS (PMOS) transistors (in a p-substrate process) is not in reverse-bias condition.

To illustrate an example voltage multiplier, reference is made to FIG. 1 which depicts a voltage doubler circuit 100 described in P. Favrat et al., "A New High Efficiency CMOS Voltage Doubler," IEEE Journal of Solid State Circuits, Vol. 33, No. 3, p. 410 (March 1998). In the depicted voltage doubler circuit 100, the cross-connected n-channel MOS (NMOS) transistors T1, T2 are connected to the capacitors CA, CB to form first and second Nakagome inverters which are driven by two non-overlapping clocks to provide boosted clock signals at nodes N1, N2. The gates of transistors M1, M2 are driven with an elevated voltage generated by a second stage booster circuit T1$a$/T1$b$/CA', T2$a$/T2$b$/CB'. To avoid threshold voltage drop, PMOS pass gate switches T3, T4 are used to connect the boosted clock signals at nodes N1, N2 to the output $V_{OUT}$, so there is no threshold voltage drop during the ON phase of the switch, and the boosted clock completely shuts off the switch during the OFF phase.

In addition, two relatively small switches T5, T6 are connected between nodes N2, N1 and the n-well bias storage capacitor $C_B$. As no load is applied to $C_B$, the voltage stored on this capacitor is the highest available in the circuit and is suitable to bias the p-MOS switch back-gate connection and keep the n-well diode reverse-biased, thereby avoiding latch-up. The voltage doubler circuit 100 requires a non-overlapping two-phase cycle to drive a single boost stage which increases the supply reference voltage through two pump capacitors, electronic switches, or non-linear elements. In addition, the dual series switches T3, T4 do not block reverse current that can be caused when the non-overlapping clocks are skewed, setting an upper limit to the practical maximum clock frequency and resulting in less efficient power transfer.

Accordingly, there is a need for an improved voltage multiplier circuit for providing a stable output voltage over load variations. There is also a need for a high efficiency voltage converter which maximizes battery life which occupies a small area and uses a minimum number of external components to reduce costs. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
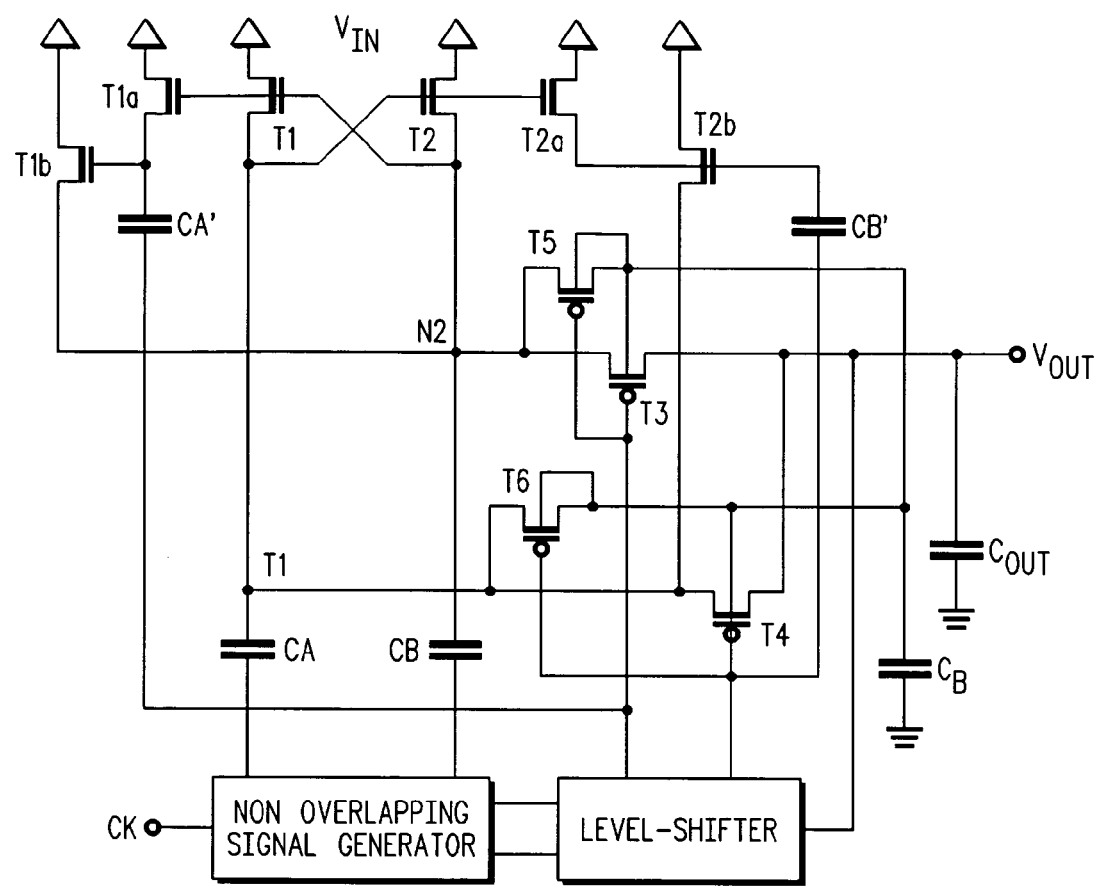
FIG. 1 depicts a circuit schematic of a prior art charge pump circuit.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A multi-stage voltage multiplication circuit and methodology are described for use in integrated circuit applications to efficiently develop an output voltage that is higher than the input supply voltage. In selected embodiments, a two-stage complementary switch is used to connect boosted clock signals from a charge pump to the multiplier output in which the complementary switches are separately clocked. With the two-stage complementary switch, return current from the storage capacitor to the pumping capacitor is blocked, thereby increasing power transfer efficiency, even at high clock frequencies when clock skews are particularly harmful to converter efficiency. In general terms, the multi-stage voltage multiplier circuit includes a booster circuit that is clocked by non-overlapping clock inputs, and a pass gate circuit that selectively couples the booster circuit to the voltage multiplier output while preventing current return. The booster circuit may be implemented with two or more symmetrical boosting stages, including a first, low load clock driver stage that is connected to drive a second, high load power driver stage. By driving the second power drive stage with the first clock driver stage, the first stage of the booster circuit has only a small capacitive load (practically no resistive load), and can therefore maintain the pumping transistors of the second power driver stage in overdrive, even when high current is pulled from second stage. As for the pass gate circuit, it may be formed with two-stage complementary charge transfer switches that are connected to the power drive stage outputs, where each two-stage switch includes a first MOSFET transistor of a first conductivity type (e.g., a p-channel (PMOS) transistor) and a second MOSFET transistor of an opposite conductivity type (e.g., an n-channel (NMOS) transistor) which are series-connected and cooperatively clocked to block backwards current. In selected embodiments, the well of the PMOS transistor is connected to the highest circuit voltage ($V_{HH}$) to prevent latch-up, and the NMOS transistor is switched by the output of a third boosting stage which further boosts the boosted clock signals.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Such descriptions and representations are used by those skilled in the art to describe and convey the substance of their work to others skilled in the art. Various illustrative embodiments of the present invention will now be described in detail below with reference to the figures.

Figure 2:
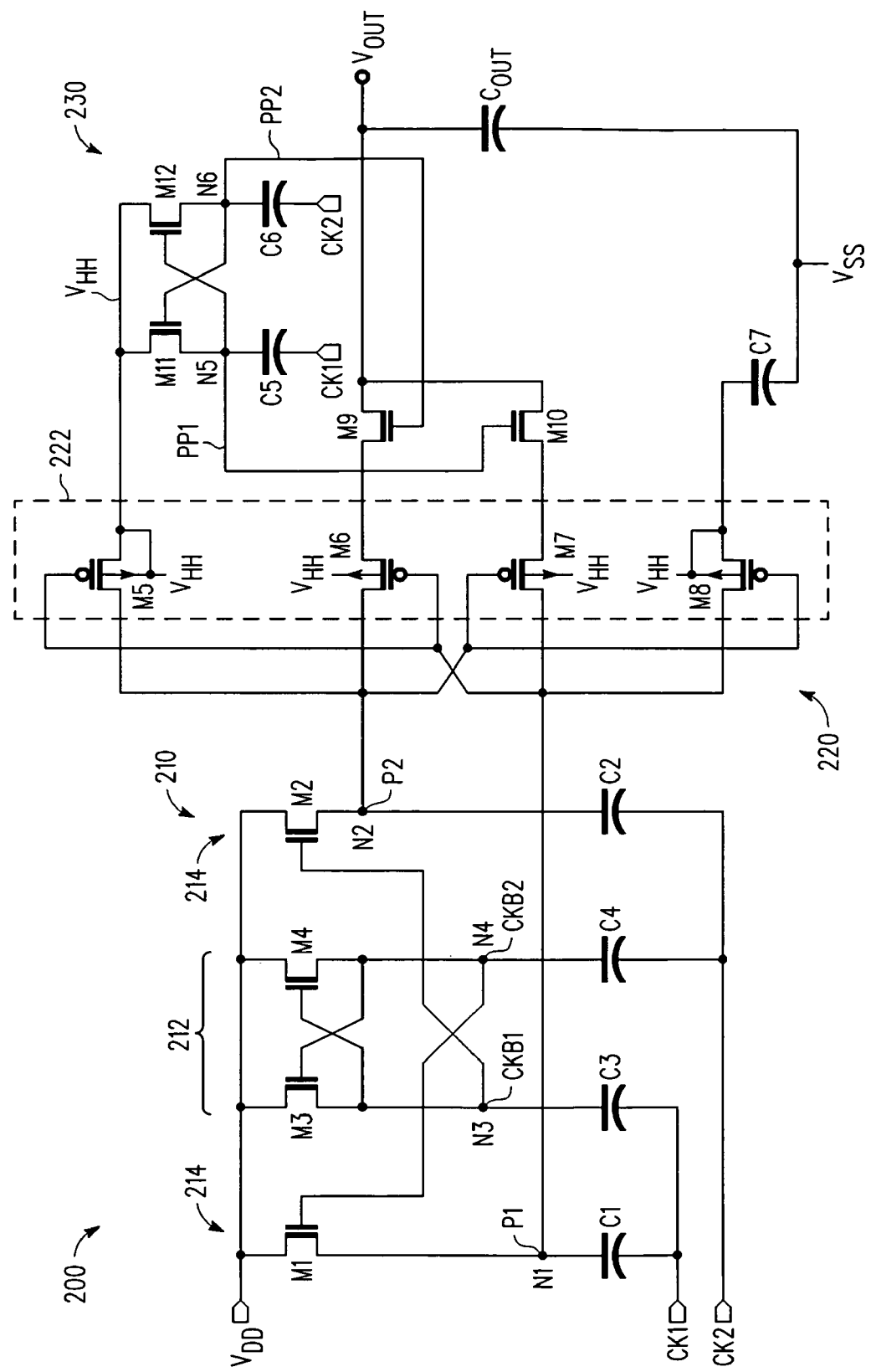
FIG. 2 depicts a circuit schematic of a high efficiency voltage multiplier circuit in accordance with selected embodiments of the present invention.

FIG. 2 depicts a circuit schematic of a high efficiency voltage multiplier circuit 200 in accordance with selected embodiments of the present invention. In the depicted example, the voltage multiplier circuit 200 includes a multi-stage booster circuit 210 for receiving an input signal (namely, non-overlapping clock signals CK1, CK2), a pass gate circuit 220 formed with two-stage complementary switches, and an additional boosting stage 230 which generates an auxiliary boosted clock for switching NMOS transistors M9 and M10 gates. Any desired clock circuit may be used to generate non-overlapping input clock signals CK1, CK2. For example, the clock circuit may be implemented as an inverter circuit which receives a first clock signal CK1 and generates therefrom a second clock signal CK2. Thus, the first clock signal CK1 may be a clocked pulse with a minimum voltage of zero volts and a maximum voltage of approximately $V_{DD}$ with a duty cycle of approximately fifty percent, and the second clock signal CK2 may be a clocked pulse that is complementary to the first clock signal CK1, having a minimum voltage of zero volts and a maximum voltage of approximately $V_{DD}$ with a duty cycle of approximately fifty percent. The clocks are non-overlapping, meaning that only one can higher than a threshold voltage at any time.

The input clock signals CK1, CK2 drive a first boosting stage 212 in the booster circuit 210. The first boosting stage 212 may be formed from a pair of small Nakagome inverters formed by cross-coupling two NMOS transistors M3, M4, each of which is connected in parallel between the input voltage $V_{DD}$ and a relatively small capacitor C3, C4 (e.g., on the order of tens or hundreds of femtofarads). As will be appreciated, a Nakagome inverter is formed by two NMOS transistors (e.g., M3 and M4), both having the drain connected to the supply voltage (e.g., $V_{DD}$), both having cross-connected gates (e.g., the gate of M3 is connected to the source of M4 and the gate of M4 is connected to the source of M3), and both being source-connected through a boosting capacitor (e.g., C3, C4) to receive a respective input signal (e.g., CK1, CK2). The capacitors C3, C4 in the first boosting stage are, in turn, coupled to receive the non-overlapping input clock signals CK1, CK2, respectively. As the non-overlapping clocks CK1, CK2 are applied to the first boosting stage 212, boosted clocks CKB1, CKB2 are generated, respectively, at the nodes N3, N4. Thus, the first boosted clock signal CKB1 may be a clocked pulse with a minimum voltage of $V_{DD}$ and a maximum voltage of approximately $2V_{DD}$ with a duty cycle of approximately fifty percent, and the second boosted clock signal CKB2 may be a clocked pulse that is complementary to the first clock signal CK1, having a minimum voltage of $V_{DD}$ and a maximum voltage of approximately $2V_{DD}$ with a duty cycle of approximately fifty percent.

The boosted clocks CKB1, CKB2 drive a second boosting stage 214 in the booster circuit 210. The second boosting stage 214 may be formed from a pair of relatively powerful Nakagome inverters which are formed by cross-coupling two NMOS transistors M1, M2, each of which is connected in parallel between the input voltage $V_{DD}$ and a relatively larger pumping capacitor C1, C2 (e.g. on the order of one or more picofarads) which receive the non-overlapping input clock signals CK1, CK2. To drive the second boosting stage 214, the gates of NMOS transistors M1, M2 are driven by the boosted clocks CKB2, CKB1, thereby developing boosted voltages P1, P2, respectively, at the nodes N1, N2. With this configuration of symmetrical boosting stages 212, 214, the first boosting stage 212 has only a capacitive load since it only drives the second boosting stage 214. Accordingly, there is minimal current load on the nodes N3, N4, meaning that the first boosting stage 212 can maximize the voltage overdrive for the second boosting stage 214.

The pass gate circuit 220 connects the DC component of the boosted voltages P1, P2 to the circuit output $V_{OUT}$ and the output storage capacitor $C_{OUT}$ to produce an output voltage that is approximately $2 V_{DD}$. In selected embodiments, the pass gate circuit 220 is implemented with a pair of current blocking switches M7/M10, M6/M9 to prevent current from flowing back from storage capacitor $C_{OUT}$ to pumping capacitors C1, C2. Each current blocking switch includes a first MOSFET transistor of a first conductivity type and a second MOSFET transistor of an opposite conductivity type which are series-connected and cooperatively clocked to block backwards current. As will be appreciated, PMOS and NMOS transistors are examples of MOSFETs having opposite conductivity types. As shown in FIG. 2, the pass gate circuit 220 may be implemented with a first pair of complementary switch transistors M6, M9 which are connected in series between the output node N2 of the second boosting stage and the circuit output $V_{OUT}$. In addition, the pass gate circuit 220 may also include a second pair of complementary switch transistors M7, M10 which are connected in series between the output node N1 of the second boosting stage and the circuit output $V_{OUT}$.

To prevent latch-up of the PMOS transistors M6, M7 in the pass gate circuit 220, the PMOS transistors M5, M8 and capacitor C7 generate an auxiliary voltage $V_{HH}$ for biasing the PMOS wells that is the highest voltage of for the circuit 200. In operation, when node P1 is approximately $2V_{DD}$, node P2 will be $V_{DD}$. In this case, the PMOS transistor M5 is turned OFF and the PMOS transistor M8 is turned ON so that the $V_{HH}$ is equal to the voltage at node P1 minus the voltage drop at transistor M8. However, when the voltage at node P2 is $2V_{DD}$ and the voltage at node P1 is $V_{DD}$, PMOS transistor M8 is turned OFF and PMOS transistor M5 is turned ON so that $V_{HH}$ will be equal to the voltage at node P2 minus the voltage drop at transistor M5. The purpose of the additional boosting stage 230 is to generate a voltage higher than $2V_{DD}$ that properly turns ON/OFF the NMOS transistors M9 and M10. In the depicted example, the additional boosting stage 230 may be formed from a third pair of small Nakagome inverters formed by cross-coupling two NMOS transistors M11, M12, each of which is connected in parallel between an auxiliary voltage node $V_{HH}$ and a relatively small capacitor C5, C6 (e.g., on the order of one or more femtofarads). The capacitors C5, C6, in turn, are coupled to receive the non-overlapping input clock signals CK1, CK2, respectively. As the non-overlapping clocks CK1, CK2 are applied to the additional boosting stage 230, additionally boosted clocks PP1, PP2 are generated, respectively, at the nodes N5, N6. As a result, the additionally boosted clocks PP1, PP2 are a tripled version of the input clock signals CK1, CK2. Thus, the first additionally boosted clock signal PP1 may be a clocked pulse with a minimum voltage of $2V_{DD}$ and a maximum voltage of approximately $3V_{DD}$ with a duty cycle of approximately fifty percent, and the second additionally boosted clock signal PP2 may be a clocked pulse that is complementary to the first additionally boosted clock signal PP1, having a minimum voltage of $2V_{DD}$ and a maximum voltage of approximately $3V_{DD}$ with a duty cycle of approximately fifty percent. With this configuration, the additionally boosted clock signals PP1 and PP2 are also non-overlapping.

In the pass gate circuit 220, the small PMOS transistors M5, M8 transfer charge to the bias charge capacitor C7 which stores an auxiliary $V_{HH}$ voltage which is used to keep the n-well reverse-biased. The pass gate circuit 220 also includes PMOS transistors M6, M7 that are connected in the power path to alternately transfer charge from the boosting section to the output load. In particular, the biasing PMOS transistor M5 is connected between the output node N2 and the auxiliary voltage $V_{HH}$ and is gated by the boosted voltage P1. Similarly, the biasing PMOS transistor M8 is connected between the output node N1 and the auxiliary voltage $V_{HH}$, and is gated by the boosted voltage P2. In addition, all of the PMOS transistors in the pass gate circuit 220 have their wells biased by the auxiliary voltage $V_{HH}$, as indicated by the dashed line 222 around the PMOS transistors M5-M8.

With this configuration, the pass gate circuit 220 implements a two-stage complementary power switch to connect boosted clock signals P1, P2 from the booster circuit 210 to the multiplier output $V_{OUT}$ without current loss to the load. In particular, a first power switch for transferring the boosted clock signal P1 is formed with PMOS transistor M7 that is driven by the complementary phase boosted voltage P2, and an NMOS transistor M10 controlled by the additionally boosted clock PP1. The charge transfer between P1 and the load can happen only when both P2 (from CK2) is low and when PP1 (from CK1) is high. Likewise, a second power switch for transferring the boosted clock signal P2 is formed with PMOS transistor M6 that is driven by the complementary phase boosted voltage P1, and an NMOS transistor M9 controlled by the additionally boosted clock PP2. The charge transfer between P2 and the load can happen only when both P1 (from CK1) is low and when PP2 (from CK2) is high. Because the complementary switches are respectively clocked by non-overlapping clock signals, return current from the storage capacitor to the pumping capacitor is blocked, thereby increasing power transfer efficiency, even at high clock frequencies. In addition, charge reflow from the auxiliary voltage $V_{HH}$ across PMOS transistors M5, M8 is negligible because PMOS transistors M5, M8 are small, only being sized sufficiently to bias the NMOS transistors M9, M10. Accordingly, the back-gate connections of PMOS transistors M5, M8 well diodes are never forward-biased and do not cause latch-up.

Figure 3:
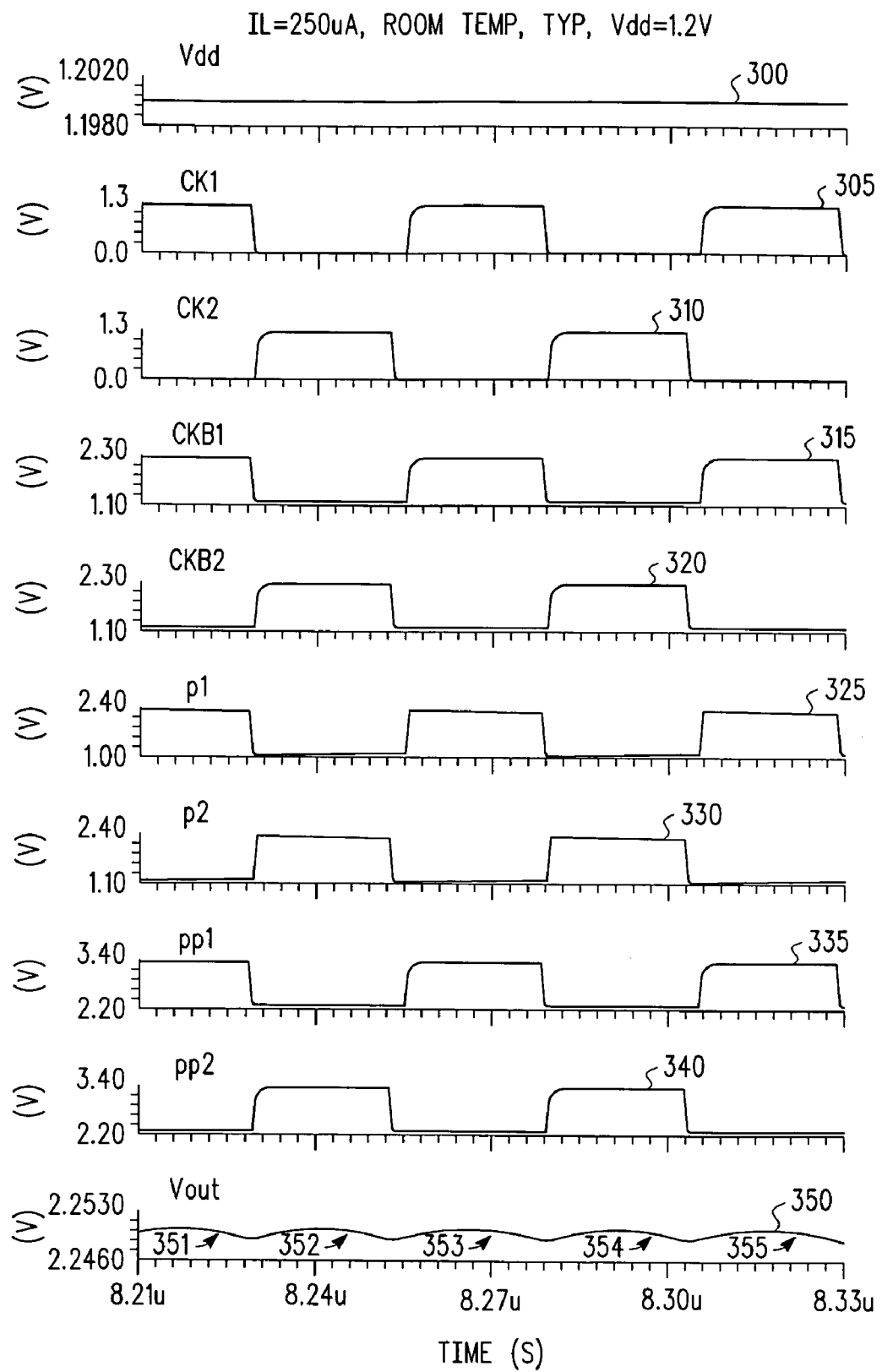
FIG. 3 depicts an example clocking scheme with example timing diagram waveforms provided by the circuit of FIG. 2.

To further illustrated selected embodiments of the present invention, reference is now made to FIG. 3 which depicts an example clocking scheme with example timing diagram waveforms provided by the multiplier circuit of FIG. 2. As depicted, complementary input clock signals CK1 305, CK2 310 are generated to have a pulse voltage from zero volts to $V_{DD}$ (e.g., 1.2 V). At the first boosting stage 212, the input clock signal CK1 drives node N3 through capacitor C3 to produce a boosted clock CKB1 35, while input clock signal CK2 drives node N4 through capacitor C4 to produce a boosted clock CKB2 320.

While input clock signal CK1 is high, the boosted clock signal CKB1 315 from the first boosting stage 212 is a positive voltage that is greater than $V_{DD}$, and is used to drive the gate of transistor M2 in the second boosting stage 214. In similar fashion, the input clock signal CK2 drives node N4 to produce a voltage CKB2 320 at the first boosting stage 212 output, which in turn drives the gate of transistor M1 in the second boosting stage 214. The resulting boosted clock signals CKB1, CKB2 have pulse voltages 325, 330 from $V_{DD}$ (e.g., 1.2 V) to $2V_{DD}$ (e.g., 2.4 V). In this way, the first clock boosting stage 212 is connected in series to the power boosting stage 214 such that the output of the first stage 212 has only a capacitive load, and the second stage 214 provides charge to the output load. As a result, the overdrive of the boosting transistors M1, M2 is not affected when the load of the pump is resistive.

Through the second boosting stage transistors M1, M2, boosted voltages P1, P2 are developed at nodes N1, N2 by driving the pumping capacitors C1, C2 with the non-overlapping input clocks CK1, CK2. The resulting boosted voltage P1, P2 have pulse voltages 325, 330 from $V_{DD}$ (e.g., 1.2 V) to $2V_{DD}$ (e.g., 2.4 V). The timing control and amplitude of input clock signals CK1, CK2 and the resulting boosted clocks CKB1, CKB2 are such that transistors M3 and M1 are both turned fully ON when the input clock CK2 is high (e.g., 1.2 V), at which point the transistors M2 and M4 are both turned OFF, as CK1 is low (e.g., 0V). Likewise, transistors M2 and M4 are both turned fully ON when the input clock CK1 is high, at which point the transistors M1 and M3 are both turned OFF by CK2 low. By clocking the symmetrical portion of the first boosting stage 212 and second boosting stage 214 with out-of-phase non-overlapping clocks CK1, CK2, it is possible to use the intermediate clocks CKB1, CKB2 of the first boosting stage 212 to drive the second boosting stage 214.

Each of the second stage outputs P1, P2 is connected to the output load $V_{OUT}$ by a complementary power switch circuit in the pass gate circuit 220. In particular, a first complementary power switch which includes a PMOS transistor M7 that is series-coupled to an NMOS transistor M10 to transfer charge uni-directionally from the second stage output node N1 to the output load $V_{OUT}$. The gate of the PMOS transistor M7 is driven by the boosted voltage P2 330 that is provided by the complementary branch (e.g., to node N2) and is synchronous with CK2. The gate of the NMOS transistor M10 is driven by the additionally boosted clock PP1 335 that is provided by the additional boosting stage 230 and is synchronous to CK1. It should be noted that the bootstrapped voltage at N1 is also synchronous to CK1. By having both M7 and M10 in the power path, the flow of charge from the output $V_{out}$ to N1 is not occurring, even in case of clock skews between CK1 and CK2. A similar but complementary behaviour happens for the switches M6, M9.

The pass gate circuit 220 also includes a small PMOS transistor M5 (driven by the boosted voltage P2) and a small PMOS transistor M8 (driven by boosted voltage P1), both of which are connected to the bias charge capacitor C7 to generate a $V_{HH}$ voltage which is coupled to bias the well of all PMOS switches. The C7 capacitor is a small decoupling capacitor required to smooth voltage spikes in $V_{HH}$ during switching, and to provide energy to the auxiliary boosting stage 230 when both M5 and M8 are not conducting. The current load on $V_{HH}$ is minimal, so $V_{HH}$ is close to $2V_{DD}$.

As indicated above, the additional or final pumping stage 230 generates additionally boosted clocks PP1 335, PP2 340. Through the additional boosting stage 230 powered by $V_{HH}$, transistors M11, M12 generate the boosted clocks PP1, PP2 at nodes N5, N6 by driving the capacitors C5, C6 with the non-overlapping input clocks CK1, CK2. The resulting additionally boosted clocks PP1, PP2 have pulse voltages 335, 340 from $2V_{DD}$ (e.g., 2.4 V) to approximately $3V_{DD}$ (e.g., 3.6 V), which will be sufficient to completely turn ON/OFF the NMOS transistors M9, M10 in the pass gate circuit 220, when the output voltage $V_{OUT}$ (nominal $2V_{DD}$) is developed. Even if a small re-flow of charge is present at $V_{HH}$, it is negligible.

As seen from the foregoing, when the input clock signal CK1 is high, the boosted voltage P1 at node N1 is a positive voltage of approximately $2V_{DD}$, and is shared with the output voltage capacitor $C_{OUT}$ through the complementary power switch transistors M7, M10 in the pass gate circuit 220, producing a voltage multiplier output $V_{OUT}$ 350 by contributing to the voltage segments 351, 353, 355, etc. This contribution of the boosted voltage P1 to $V_{OUT}$ continues until the input clock CK1 switches from "high" to "low," at which time PP1 falls and the power switch M10 is also turned OFF and node N1 falls, turning ON PMOS transistor M6. After the input clock signal CK1 has fallen, the complementary input clock CK2 rises, thereby charging node N2 to the boosted voltage P2 and turning OFF the PMOS transistor M7 in the pass gate circuit 220. Simultaneously, the transistor M9 is turned ON as PP2 rises with CK2 so that the charge can flow from N2 to $C_{out}$, producing a voltage multiplier output 350 by contributing to the voltage segments 352, 354, etc.

As described herein, a booster circuit alternately pumps two charge pump nodes to an elevated voltage by using a clock boost stage to maintain the pumping transistors of the second power boost stage in overdrive. The elevated voltage is then transferred or passed to the output load over a pair of power switches. Each power switch may be formed with a series-coupled PMOS and NMOS transistors which are separately gated or clocked to prevent current backflow that can arise when the input clocks CK1, CK2 are skewed. Even with the increased resistivity in the current path from the complementary power switches and the separate clocking overhead, the overall efficiency of the disclosed voltage multiplier is improved by 5-10% as compared to conventional single switch pass gate configurations which lose power transfer efficiency due to backwards current, especially at high frequencies when switch clocks might not be perfectly aligned due to parasitics and circuit non-idealities. In addition, the disclosed voltage multiplier can be clocked at higher frequencies than older solutions, thereby allowing for smaller charging capacitors for the same output current. Though each power switch may be implemented with a PMOS transistor that is series-coupled to an NMOS transistor, it will be appreciated that any number of transistors of either type could be used to provide high conductance to connect the boosted voltages P1, P2 to the output $V_{OUT}$. For example, if higher conductance were required, two or more N-channel or P-channel transistors could be used.

Figure 4:
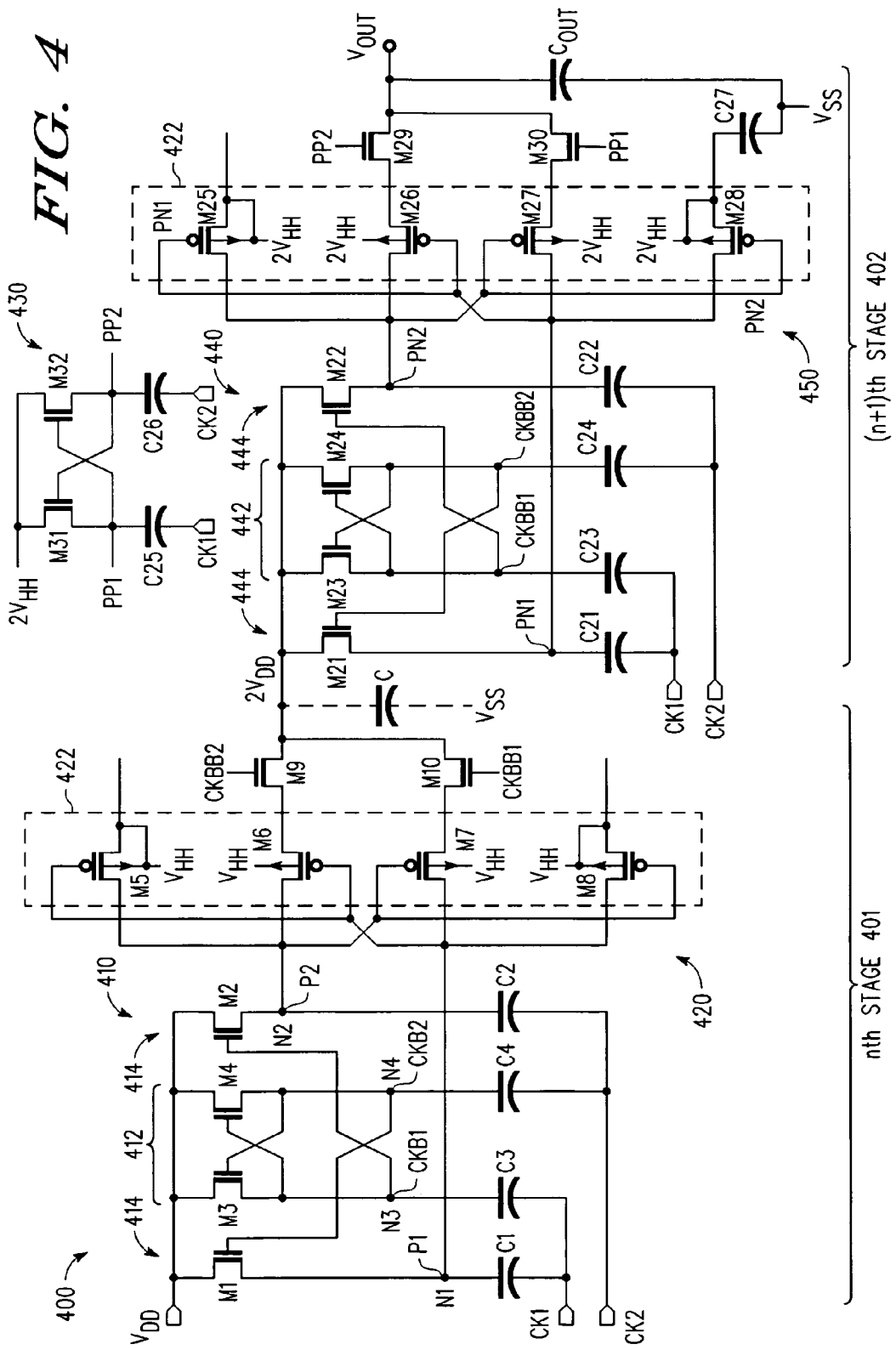
FIG. 4 depicts an example circuit schematic of a high efficiency multi-stage voltage multiplier circuit in accordance with selected embodiments of the present invention.

While the disclosed voltage multiplier has been described with reference to a two-stage charge pump shown in FIG. 2 for doubling the input supply voltage $V_{DD}$, it will be appreciated that the architecture may be scaled to provide any multiple of the supply voltage with highest efficiency. Generally speaking, an integer multiple of the supply voltage is obtained by including a supplemental (or fourth) boosting stage to the output of the booster circuit 210. For example, FIG. 4 depicts an example circuit schematic of a high efficiency multi-stage voltage tripler circuit 400 in accordance with selected embodiments of the present invention. In the depicted example, the voltage tripler circuit 400 includes two stages, where the first or nth stage 401 serves as a boost-switch circuit that drives the supply voltage for a second or (n+1)th stage 402. The nth stage 401 is identical to the voltage multiplier circuit 200 shown in FIG. 2, except that there is no additional boosting stage required for the nth stage 401 because the switching NMOS transistors M9 and M10 gates of the pass gate in the nth stage 401 are instead driven by the boosted clocks CKBB1, CKBB2 from the (n+1)th stage 402. And instead of driving the output load $V_{OUT}$, the nth stage is coupled to a two-stage booster circuit in the (n+1)th stage 402. Thus, the nth stage 401 includes a two-stage booster circuit 410 (formed with symmetrical boosting stages 412, 414) and a pass gate circuit 420 (formed with two-stage complementary switches M6/M9, M7/M10). The (n+1)th stage 402 is connected to operate in a similar fashion by using a two-stage booster circuit 440 (formed with symmetrical boosting stages 442, 444), a pass gate circuit 450 (formed with two-stage complementary switches M26/M29, M27/M30) to connect the boosted clock signals at nodes PN1, PN2 to the output $V_{OUT}$, and a last boosting stage 430 which generates a boosted auxiliary boosted clock PP1, PP2 for switching NMOS transistors M29 and M30 gates. While no additional boosting stage is required for the nth stage 401 when the boosted clocks CKBB1, CKBB2 of the supplemental boosting stage 402 are used, an additional boosting stage 430 is needed at the last multiplier stage 402 to drive the switching NMOS transistors M29 and M30 gates of the pass gate in the nth stage 401.

As demonstrated with the example multiplier circuits described herein, a voltage multiplier charge pump circuit can be readily configured to output any integer multiple of the supply voltage $V_{DD}$ by enabling or disabling any number of additional boost-switch portions in the path. The sequential connection of one or more boost-switch circuits in front of a final stage allows the combined voltage pump to be adjusted to boost the input voltage $V_{DD}$ to different levels. Alternatively, the additional boost-switch portions can be used to maintain the output voltage at a controlled level when the input voltage or output load vary. An example of this voltage maintenance application for the voltage multiplier circuit is a system where the charge pump is used to supply a constant output voltage (e.g., 2.5V to 3.3V) that is suitable for powering a microcontroller by adjustably boosting an input voltage from an AA battery voltage whose voltage ranges from 1.6V (new) to 0.95V (end of life). According to the microcontroller speed and consumption, the charge pump can be configured to optimally supply the microcontroller in order to maximize efficiency, and therefore battery duration.

By now it should be appreciated that there has been provided voltage multiplier circuit which includes a multi-stage charge pump and a pass gate circuit for conducting charge current from the charge pump to an output node. The multi-stage charge pump receives and boosts non-overlapping first and second clock input signals in voltage to first and second target voltages at first and second nodes of the charge pump.

In selected embodiments, the multi-stage charge pump includes a clock driver stage (for boosting the non-overlapping first and second clock input signals in voltage to first and second boosted clock signals at first and second internal nodes) and a power driver stage (which is coupled to be driven by the clock driver stage for generating the first and second target voltages at the first and second nodes). The clock driver stage and power driver stage may each be implemented as a pair of symmetrical Nakagome inverters that are coupled to receive the non-overlapping first and second clock input signals and to generate therefrom boosted clock signals. At the pass gate circuit, a first complementary switch pair circuit conducts charge current from the first node to an output node using a series-coupled PMOS transistor and NMOS transistor which are separately gated to prevent current backflow from the output node. In addition, the pass gate circuit includes a second complementary switch pair circuit for conducting charge current from the second node to the output node using a series-coupled PMOS transistor and NMOS transistor which are separately gated to prevent current backflow from the output node. In the first complementary switch pair circuit, the PMOS transistor may be gated by the second target voltage at the second node, and the NMOS transistor may be gated by a boosted version of the first clock input signal. Likewise, in the second complementary switch pair circuit, the PMOS transistor may be gated by the first target voltage at the first node, and the NMOS transistor may be gated by a boosted version of the second clock input signal. In selected embodiments, the voltage multiplier circuit also includes a first biasing PMOS transistor for boosting the first target voltage to a boosted auxiliary voltage under control of the second target voltage, and a second biasing PMOS transistor for boosting the second target voltage to the boosted auxiliary voltage under control of the first target voltage. To prevent latch-up, the boosted auxiliary voltage may be coupled to provide well bias for the PMOS transistors. The voltage multiplier circuit may also include a third boosting stage for boosting non-overlapping first and second clock input signals in voltage to third and fourth boosted clock signals at third and fourth nodes, respectively, where the third and fourth boosted clock signals are elevated in voltage with respect to the first and second boosted clock signals.

To extend the voltage multiplier circuit to provide additional voltage levels, a boost switch circuit may be coupled to power the voltage multiplier circuit, where the boost switch circuit includes a second multi-stage charge pump and a second pass gate circuit. The second multi-stage charge pump boosts the non-overlapping clock input signals in voltage to third and fourth target voltages at third and fourth internal nodes, respectively. As for the second pass gate circuit, it includes a third complementary switch pair circuit for conducting charge current from the third internal node to a supply voltage for the first multi-stage charge pump, and also includes a fourth complementary switch pair circuit for conducting charge current from the fourth internal node to the supply voltage for the first multi-stage charge pump. As disclosed, each of the complementary switch pair circuits is implemented with a series-coupled PMOS transistor and NMOS transistor which are separately gated to prevent current backflow from the first multi-stage charge pump. This gating may be accomplished by gating the PMOS transistor in the third complementary switch pair circuit with the fourth target voltage at the fourth internal node and gating the NMOS transistor in the third complementary switch pair circuit with a boosted version of the first clock input signal provided by the first multi-stage charge pump. Likewise, the fourth complementary switch pair circuit may be gated by gating its PMOS transistor with the third target voltage at the third internal node, and by gating the NMOS transistor in the fourth complementary switch pair circuit with a boosted version of the second clock input signal provided by the first multi-stage charge pump. When a boost switch circuit is used to drive the voltage multiplier circuit, a final boosting stage is provided to boost the non-overlapping first and second clock input signals in voltage to third and fourth boosted clock signals at third and fourth nodes, respectively, where the third and fourth boosted clock signals are elevated in voltage with respect to the first and second target voltages and are applied, respectively, to gate the NMOS transistors of the first and second complementary switch pair circuits in the pass gate circuit.

In another form, there is provided voltage multiplier for receiving an input voltage from a voltage source, and for receiving non-overlapping first and second clock input signals from a signal source. In the voltage multiplier, a first multi-stage charge pump boosts the non-overlapping first and second clock input signals in voltage to first and second target voltages at first and second nodes, respectively. In addition, a first complementary switch pair circuit conducts charge current from the first node to an output node using a first P-channel transistor (having a gate, drain and source) and a first N-channel transistor (having a gate, drain and source), where the gate of the first P-channel transistor is connected to the second node of the first multi-stage charge pump, and the gate of the first N-channel transistor is connected to a boosted version of the first clock input signal. In this way, whereby the first P-channel transistor and first N-channel transistor are separately gated to prevent current backflow from the output node to the first node. Finally, a second complementary switch pair circuit conducts charge current from the second node to the output node using a second P-channel transistor and a second N-channel transistor, where the gate of the second P-channel transistor is connected to the first node of the first multi-stage charge pump, and where the gate of the second N-channel transistor is connected to a boosted version of the second clock input signal. Thus, the second P-channel transistor and second N-channel transistor are separately gated to prevent current backflow from the output node to the second node. In selected embodiments, the voltage multiplier also includes a first biasing PMOS transistor (for connecting the first target voltage to a boosted auxiliary voltage under control of the second target voltage) and a second biasing PMOS transistor (for boosting the second target voltage to the boosted auxiliary voltage under control of the first target voltage), where the boosted auxiliary voltage is connected to bias one or more well regions of the first and second P-channel transistors. To provide additional boost, the voltage source may be implemented as a boost switch circuit which includes a second multi-stage charge pump that is coupled through a pass gate circuit that conducts charge current from the second multi-stage charge pump to a supply voltage for the first multi-stage charge pump by using a a pair of complementary switch pair circuits, where each of the complementary switch pair circuits comprises a series-coupled PMOS transistor and NMOS transistor which are separately gated to prevent current backflow from the first multi-stage charge pump.

In yet another form, there is provided voltage doubler circuit for generating an output voltage that is twice the magnitude of the an input voltage. In the voltage doubler circuit, a first multi-stage charge pump receives an input voltage and non-overlapping first and second clock input signals, and generates therefrom a first boosted output voltage at a first internal node and a second boosted output voltage at a second internal node, where the first and second boosted output voltages are substantially twice as large as the input voltage. To conduct charge current from the first and second internal nodes to an output node, a pass gate circuit is provided that includes first and second complementary switch pair circuits. The first complementary switch pair circuit may be implemented with a first PMOS transistor and a first NMOS transistor that are coupled in series between the first internal node and the output node, where the first PMOS transistor is gated by the second boosted output voltage at the second internal node and where the first NMOS transistor is gated by a boosted version of the first clock input signal. Similarly, the second complementary switch pair circuit may be implemented with a second PMOS transistor and a second NMOS transistor coupled in series between the second internal node and the output node, where the second PMOS transistor is gated by the first boosted output voltage at the first internal node and where the second NMOS transistor is gated by a boosted version of the second clock input signal. To drive the pass gate circuit, a final boosting stage is provide that boosts the non-overlapping first and second clock input signals in voltage to first and second boosted clock signals at third and fourth nodes, respectively, where the first and second boosted clock signals are elevated in voltage with respect to the first and second boosted output voltages and are applied, respectively, to gate the NMOS transistors of the first and second complementary switch pair circuits in the pass gate circuit. The pass gate circuit may also include first and second biasing PMOS transistors for connecting the first and second internal nodes, respectively, to a boosted auxiliary voltage, where the boosted auxiliary voltage is also connected to bias one or more well regions of the first and second PMOS transistors in the pass gate circuit.

The methods and systems for generating a multiplied voltage using a combination of a multi-stage boosting circuit and alternately clocked complementary power switches as shown and described herein with reference to specific embodiments may be implemented in other circuit configurations, conductivity types and/or voltage polarities However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. Note that the terms "couple" and "connect" has been used to denote that one or more additional conductive and/or capacitive elements may be interposed between two elements that are coupled.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A voltage multiplier circuit, comprising:
    a first multi-stage charge pump for boosting non-overlapping first and second clock input signals in voltage to first and second target voltages at first and second nodes, respectively; and
    a pass gate circuit comprising a first complementary switch pair circuit for conducting charge current from the first node to an output node, and a second complementary switch pair circuit for conducting charge current from the second node to the output node, where each of the first and second complementary switch pair circuits comprises a first MOS transistor of a first conductivity type that is coupled in series with a second MOS transistor of a second opposite conductivity type, where the first and second MOS transistors are separately gated to prevent current backflow from the output node.

2. The voltage multiplier circuit of claim 1, where the first multi-stage charge pump comprises:
    a clock driver stage for boosting the non-overlapping first and second clock input signals in voltage to first and second boosted clock signals at first and second internal nodes, respectively; and
    a power driver stage coupled to be driven by the clock driver stage for generating the first and second target voltages at the first and second nodes, respectively.

3. The voltage multiplier circuit of claim 2, where the clock driver stage comprises a first pair of symmetrical Nakagome inverters coupled receive the non-overlapping first and second clock input signals and to generate therefrom the first and second boosted clock signals.

4. The voltage multiplier circuit of claim 3, where the power driver stage comprises a second pair of symmetrical Nakagome inverters coupled receive the non-overlapping first and second clock input signals and to generate therefrom the first and second target voltages at the first and second nodes.

5. The voltage multiplier circuit of claim 1, where the first complementary switch pair circuit comprises a first PMOS transistor coupled in series between the first node and a first NMOS transistor, where the first PMOS transistor is gated by the second target voltage at the second node and where the first NMOS transistor is gated by a boosted version of the first clock input signal.

6. The voltage multiplier circuit of claim 5, where the second complementary switch pair circuit comprises a second PMOS transistor coupled in series between the second node and a second NMOS transistor, where the second PMOS transistor is gated by the first target voltage at the first node and where the second NMOS transistor is gated by a boosted version of the second clock input signal.

7. The voltage multiplier circuit of claim 1, further comprising:
    a first biasing PMOS transistor for boosting the first target voltage to a boosted auxiliary voltage under control of the second target voltage, and
    a second biasing PMOS transistor for boosting the second target voltage to the boosted auxiliary voltage under control of the first target voltage.

8. The voltage multiplier circuit of claim 7, where the boosted auxiliary voltage is coupled to provide well bias for the first biasing PMOS transistor, the second biasing PMOS transistor and each PMOS transistor in the first and second complementary switch pair circuits.

9. The voltage multiplier circuit of claim 1, further comprising a third boosting stage for boosting non-overlapping first and second clock input signals in voltage to third and fourth boosted clock signals at third and fourth nodes, respectively, where the third and fourth boosted clock signals are elevated in voltage with respect to the first and second target voltages and are provided to drive the NMOS transistors in the first and second complementary switch pair circuits, respectively.

10. The voltage multiplier circuit of claim 1, further comprising a boost switch circuit coupled to power the voltage multiplier circuit, where the boost switch circuit comprises:
a second multi-stage charge pump for boosting non-overlapping first and second clock input signals in voltage to third and fourth target voltages at third and fourth nodes, respectively; and
a second pass gate circuit comprising a third complementary switch pair circuit for conducting charge current from the third node to a supply voltage for the first multi-stage charge pump, and a fourth complementary switch pair circuit for conducting charge current from the fourth node to the supply voltage for the first multi-stage charge pump, where each of the third and fourth complementary switch pair circuits comprises a series-coupled PMOS transistor and NMOS transistor which are separately gated to prevent current backflow from the first multi-stage charge pump.

11. The voltage multiplier circuit of claim 10, where the third complementary switch pair circuit comprises a first PMOS transistor coupled in series between the third node and a first NMOS transistor, where the first PMOS transistor is gated by the fourth target voltage at the fourth node and where the first NMOS transistor is gated by a boosted version of the first clock input signal provided by the first multi-stage charge pump.

12. The voltage multiplier circuit of claim 11, where the fourth complementary switch pair circuit comprises a first PMOS transistor coupled in series between the fourth node and a first NMOS transistor, where the first PMOS transistor is gated by the third target voltage at the third node and where the first NMOS transistor is gated by a boosted version of the first clock input signal provided by the first multi-stage charge pump.

13. The voltage multiplier circuit of claim 10, further comprising a last boosting stage for boosting non-overlapping first and second clock input signals in voltage to third and fourth boosted clock signals at third and fourth nodes, respectively, where the third and fourth boosted clock signals are elevated in voltage with respect to the first and second target voltages and are applied, respectively, to gate the NMOS transistors of the first and second complementary switch pair circuits in the pass gate circuit.

14. A voltage multiplier, comprising:
a voltage source for providing an input voltage;
a signal source for providing non-overlapping first and second clock input signals;
a first multi-stage charge pump for boosting the non-overlapping first and second clock input signals in voltage to first and second target voltages at first and second nodes, respectively;
a first complementary switch pair circuit for conducting charge current from the first node to an output node comprising a first P-channel transistor having a gate, drain and source and a first N-channel transistor having a gate, drain and source, the gate of the first P-channel transistor being connected to the second node of the first multi-stage charge pump and the gate of the first N-channel transistor being connected to a boosted version of the first clock input signal, whereby the first P-channel transistor and first N-channel transistor are separately gated to prevent current backflow from the output node to the first node; and
a second complementary switch pair circuit for conducting charge current from the second node to the output node comprising a second P-channel transistor having a gate, drain and source and a second N-channel transistor having a gate, drain and source, the gate of the second P-channel transistor being connected to the first node of the first multi-stage charge pump and the gate of the second N-channel transistor being connected to a boosted version of the second clock input signal, whereby the second P-channel transistor and second N-channel transistor are separately gated to prevent current backflow from the output node to the second node.

15. The voltage multiplier of claim 14, further comprising:
a first biasing P-channel transistor for connecting the first target voltage to a boosted auxiliary voltage under control of the second target voltage, and
a second biasing P-channel transistor for boosting the second target voltage to the boosted auxiliary voltage under control of the first target voltage,
where the boosted auxiliary voltage is connected to bias one or more well regions of the first and second P-channel transistors.

16. The voltage multiplier of claim 14, where the voltage source comprises a boost switch circuit comprising:
a second multi-stage charge pump for boosting the non-overlapping first and second clock input signals in voltage to third and fourth target voltages at third and fourth nodes, respectively; and
a pass gate circuit comprising a third complementary switch pair circuit for conducting charge current from the third node to a supply voltage for the first multi-stage charge pump, and a fourth complementary switch pair circuit for conducting charge current from the fourth node to the supply voltage for the first multi-stage charge pump, where each of the third and fourth complementary switch pair circuits comprises a series-coupled P-channel transistor and N-channel transistor which are separately gated to prevent current backflow from the first multi-stage charge pump.

17. The voltage multiplier of claim 16, where the third complementary switch pair circuit comprises a first P-channel transistor coupled in series between the third node and a first N-channel transistor, where the first P-channel transistor is gated by the fourth target voltage at the fourth node and where the first N-channel transistor is gated by a boosted version of the first clock input signal provided by the first multi-stage charge pump, and where the fourth complementary switch pair circuit comprises a second P-channel transistor coupled in series between the fourth node and a second N-channel transistor, where the second P-channel transistor is gated by the third target voltage at the third node and where the second N-channel transistor is gated by a boosted version of the first clock input signal provided by the first multi-stage charge pump.

18. A voltage doubler circuit, comprising:
a first multi-stage charge pump for receiving an input voltage and non-overlapping first and second clock input signals, and generating therefrom a first boosted output voltage at a first internal node and a second boosted output voltage at a second internal node, where the first and second boosted output voltages are substantially twice as large as the input voltage; and
a pass gate circuit comprising first and second complementary switch pair circuits for conducting charge current from the first internal node and the second internal node, respectively, to an output node, where the first complementary switch pair circuit comprises a first PMOS transistor and a first NMOS transistor coupled in series between the first internal node and the output node, where the first PMOS transistor is gated by the second boosted output voltage at the second internal node and where the first NMOS transistor is gated by a boosted version of the first clock input signal, and where the second complementary switch pair circuit comprises a second PMOS transistor and a second NMOS transistor coupled in series between the second internal node and the output node, where the second PMOS transistor is gated by the first boosted output voltage at the first internal node and where the second NMOS transistor is gated by a boosted version of the second clock input signal.

19. The voltage doubler circuit of claim 18, further comprising a final boosting stage for boosting the non-overlapping first and second clock input signals in voltage to first and second boosted clock signals at third and fourth nodes, respectively, where the first and second boosted clock signals are elevated in voltage with respect to the first and second boosted output voltages and are applied, respectively, to gate the NMOS transistors of the first and second complementary switch pair circuits in the pass gate circuit.

20. The voltage doubler circuit of claim 18, where the pass gate circuit further comprises:

a first biasing PMOS transistor for connecting the first internal node to a boosted auxiliary voltage under control of the second boosted output voltage at a second internal node, and a second biasing PMOS transistor for connecting the second internal node to a boosted auxiliary voltage under control of the first boosted output voltage at a first internal node, where the boosted auxiliary voltage is connected to bias one or more well regions of the first and second PMOS transistors in the pass gate circuit.

* * * * *